United States Patent
Tanibuchi et al.

(10) Patent No.: US 6,831,639 B2
(45) Date of Patent: Dec. 14, 2004

(54) COMPUTER READABLE STORAGE MEDIUM STORING 3-D GAME IMAGE PROCESSING PROGRAM, 3-D GAME IMAGE PROCESSING METHOD, VIDEO GAME MACHINE, AND 3-D GAME IMAGE PROCESSING PROGRAM

(75) Inventors: Hiroshi Tanibuchi, Nishinomiya (JP); Katsuyoshi Endo, Ikeda (JP); Hideki Nagahama, Takasago (JP); Atsuko Chikawa, Nara (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 105 days.

(21) Appl. No.: 10/103,272

(22) Filed: Mar. 20, 2002

(65) Prior Publication Data

US 2002/0140697 A1 Oct. 3, 2002

(30) Foreign Application Priority Data

Mar. 29, 2001 (JP) ........................................ 2001-097626

(51) Int. Cl.$^7$ ............................................... G06T 15/00
(52) U.S. Cl. ....................... 345/419; 345/427; 345/621; 345/653; 345/664; 345/757; 463/32
(58) Field of Search ................................. 345/418, 419, 345/427, 621, 653, 664, 679, 757; 463/31, 32

(56) References Cited

U.S. PATENT DOCUMENTS

| 5,577,960 A | | 11/1996 | Sasaki | |
|---|---|---|---|---|
| 6,030,289 A | * | 2/2000 | Nomi et al. | 463/32 |
| 6,268,862 B1 | * | 7/2001 | Uchiyama et al. | 345/427 |
| 6,390,918 B1 | * | 5/2002 | Yagi et al. | 463/32 |
| 6,425,826 B1 | * | 7/2002 | Nakanishi et al. | 463/31 |
| 6,542,151 B1 | * | 4/2003 | Minami et al. | 345/419 |
| 6,612,930 B2 | * | 9/2003 | Kawagoe et al. | 463/33 |

FOREIGN PATENT DOCUMENTS

| EP | 0 817 129 | 1/1998 |
|---|---|---|
| EP | 1 033 682 | 9/2000 |
| EP | 1 170 701 | 1/2002 |

OTHER PUBLICATIONS

Raskar R et al: "Image Precision Silhouette Edges" Proceedings of the 1999 Symposium on Interactive 3D Graphics. Atlanta, GA, Apr. 26–28, 1999, Proceedings of the Symposium on Interactive 3D Graphics, New York, NY: ACM, US, Apr. 26 1999, pp. 135–140, 231, XP001032571 ISBN: 1–58113–082–1 paragraph 3.2 * abstract *.

A. Lake, C. Marshall et al. "Stylized Rendering Techniques for Scalable Real–Time 3D Animation" Proceedings of NPAR 2000, Annecy, France, pp. 13–20, Jun. 2000.

* cited by examiner

*Primary Examiner*—Matthew C. Bella
*Assistant Examiner*—Mackly Monestime
(74) *Attorney, Agent, or Firm*—Jordan and Hamburg LLP

(57) ABSTRACT

The present invention is for easily drawing a polygon model having borderlines at high-speed. The video game machine comprises a recording medium 200 for enlarging the 3-D model where a normal vector of each polygon faces the outside at a predetermined enlargement ratio, overlaying a back model, where a normal vector of each polygon faces the inside, onto the above model and storing the integrated model as a framed model in advance, and a drawing processor 10 for drawing only polygons facing the direction of the view point position of the virtual camera in a virtual game space on the monitor 22 based on the drawing instructions of the framed model.

12 Claims, 7 Drawing Sheets

(1)   (2)

(1)  (2)

$V_{N1} \cdot V_C > 0$ $V_{N2} \cdot V_C < 0$

COMPUTER READABLE STORAGE MEDIUM STORING 3-D GAME IMAGE PROCESSING PROGRAM, 3-D GAME IMAGE PROCESSING METHOD, VIDEO GAME MACHINE, AND 3-D GAME IMAGE PROCESSING PROGRAM

BACKGROUND OF THE INVENTION

1. Field of the Invention

The present invention relates to a computer readable storage medium storing a 3-D (dimensional) game image processing program, a 3-D (dimensional) game image processing method, a 3-D (dimensional) game image processing program and a video game machine for drawing 3-D (dimensional) models comprised of a plurality of polygons in a virtual game space displayed on a monitor.

2. Description of the Related Art

In a game played in a 3-D space, a technique to express polygon models like animation by adding border lines has been known, where a polygon model is differentiated from an image to be the background by adding border lines (border exaggeration) so as to make the target polygon model stand out.

For example, Japanese Patent Laid-Open No. 2000-251094 states that when border lines are added to a 3-D model comprised of a plurality of polygons, data on the model to which border lines are added is read from a memory, an enlarged model where the model was enlarged at a predetermined ratio is created and stored in a memory once, geometry processing to overlay this enlarged model onto the original 3-D model is performed, the normal vector of the polygons of the enlarged model is inverted, then rendering processing to overlay both models onto the image to be the background is performed. By performing such image processing, a model where borderlines are added can be displayed on the monitor.

However, when border lines are added to a model by such an image processing method, the enlarged model must be temporarily held, which requires a memory to store the enlarged model. Also, as described above, geometry processing and rendering processing are required, and it takes time for these processings, so it is difficult to add border lines to many models as a game image display method which is required to display images at a predetermined frame cycle, and this method cannot be applied to 3-D video games. Also if a model for border lines is generated from an original 3-D model by a mechanical operation, as in the conventional method described above, the border lines sometimes deviate or border lines are not displayed due to the shape of the polygon model and the position of the view point of the virtual camera.

SUMMARY OF THE INVENTION

To solve the above problems, it is an object of the present invention to provide a 3-D game image processing program, a 3-D game image processing method, and a video game machine which do not require a memory to temporarily hold the enlarged model, decreasing the processing time required to add border lines to a 3-D model comprised of a plurality of polygons, and can be sufficiently applied to the display of game images which require adding border lines to many models According to the present invention, a computer readable recording medium stores a 3-D game image processing program for drawing a model comprised of a plurality of polygons in a virtual game space. The 3-D game image processing program comprises the steps of: (a) storing a framed model; said frame model is made by: enlarging a 3-D model formed with a plurality of polygons; inverting a direction of a normal vector of each polygon constituting said enlarged model opposite to a direction of a normal vector of each polygon constituting said 3-D model to form a back model; and overlaying said back model on said 3-D model to form said framed model; and (b) drawing only polygons facing the direction of the viewpoint position of said virtual camera according to a drawing instruction of said framed model.

With the aforementioned features, a back model, where a direction of a normal vector of each polygon constituting an enlarged model which is acquired by enlarging a 3-D model is a direction opposite the direction of a normal vector of each polygon constituting the 3-D model, is overlaid onto the model and is stored in advance as a framed model. According to the drawing instructions of the framed model, the framed model is read from a recording medium, and based on the view point position of a virtual camera in the virtual game space and the direction of the normal vector of each polygon constituting the framed model, it is judged whether the polygon has a normal vector facing the direction of the view point position of the virtual camera. And only polygons which were judged as having a normal vector facing the direction of the view point position of the virtual camera are drawn.

These and other objects, features, and advantages of the present invention will become more apparent upon reading the following detailed description along with the accompanied drawings.

Note that throughout this specification the terms "3-dimensional" and "2-dimensional" are expressed as "3-D" and "2-D", respectively, for short.

DESCRIPTION OF THE PREFERRED EMBODIMENTS

Note that throughout this specification the terms "3-dimensional" and "2-dimensional" are expressed as "3-D" and "2-D", respectively, for short.

Figure 1:
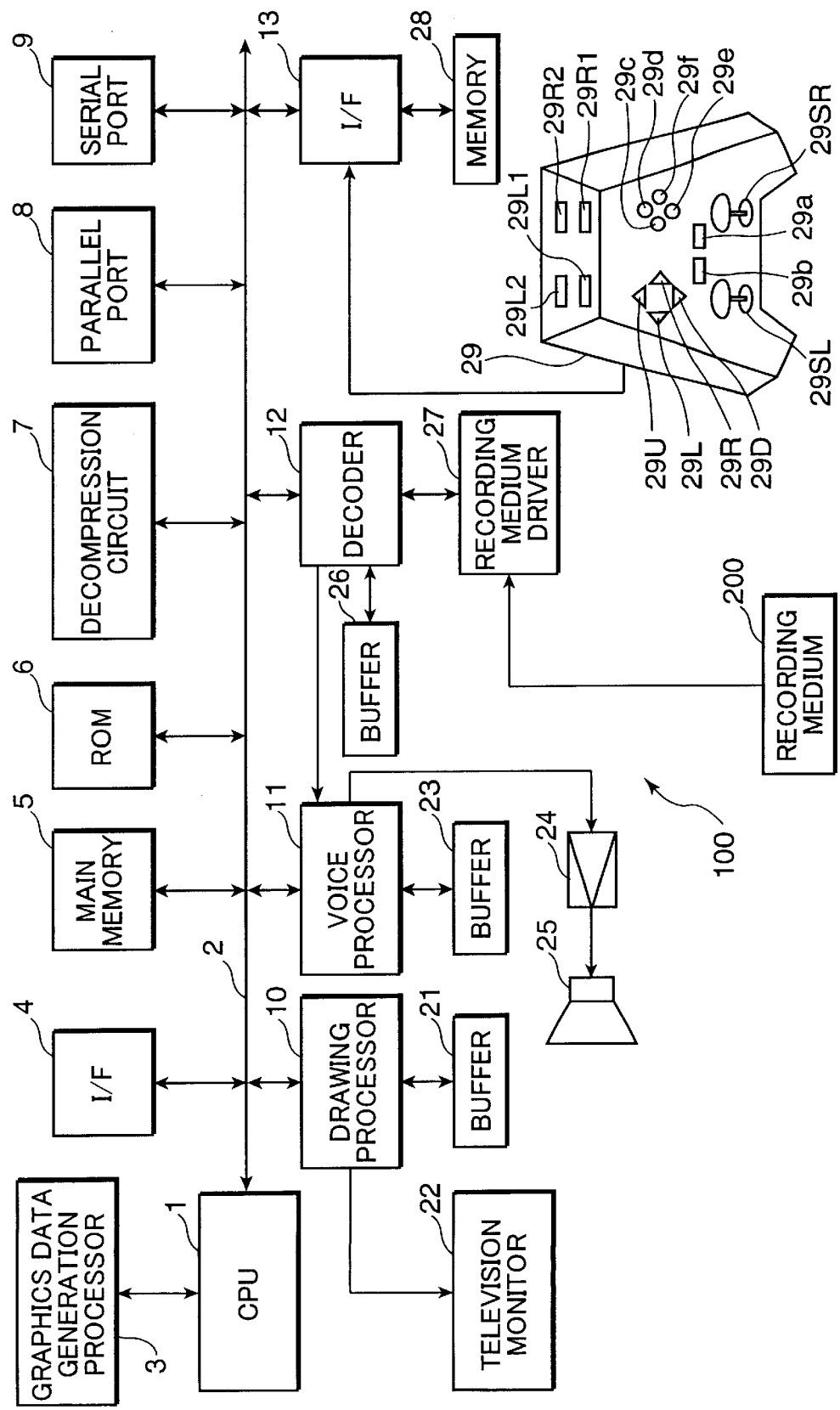
FIG. 1 is a block diagram showing the electrical configuration of the video game system (video game machine) to which a 3-D game image processing method according to an embodiment of the present invention is applied.

FIG. 1 is a block diagram showing the electrical configuration of the video game system (video game machine) to which the 3-dimensional game image processing method according to an embodiment of the present invention is applied. This game system is comprised of a game machine main body 100 and a recording medium 200 where program data is recorded. The game machine main body 100 is further comprised of a CPU (Central Processing Unit) 1, a bus line 2 connected to the CPU 1, which is further comprised of an address bus, data bus and control bus, and a graphics data generation processor 3.

An interface circuit 4, a main memory 5 including RAM (Random Access Memory), a ROM (Read Only Memory) 6, a decompression circuit 7, a parallel port 8, a serial port 9, a drawing processor 10, a voice processor 11, a decoder 12, and an interface circuit 13 are connected to the bus line 2.

The drawing processor 10A is connected with a buffer 21 and a television monitor (hereafter referred to as a monitor) 22, which is a display means, and the voice processor 11 is connected with a buffer 23, and also with a speaker 25 via an amplification circuit 24. A buffer 26 and a recording medium driver 27 are connected to the decoder 12, and a memory 28 and a controller 29 are connected to the interface circuit 13.

The format of this game system is different depending on the application. For example, when this system is configured for home use, the monitor 22 and the speaker 25 are separated from the game machine main body 100. And when the game machine is configured for business use, the composing elements shown in FIG. 1 may be housed in one body. In the present embodiment, a case when this game system is configured for home use will be described as an example.

When this game machine is configured with a personal computer or workstations as the core, the monitor 22 corresponds to the display for the computer, the drawing processor 10, voice processor 11 and decompression circuit 7 correspond to a part of the program data recorded in the recording medium 200 or hardware on the expansion board to be installed into the expansion slot of the computer, and the interface circuit 4, parallel port 8, serial port 9, and interface circuit 13 corresponds to the hardware on the expansion board to be installed into the expansion slot of the computer. And buffers 21, 23 and 26 correspond to each area of the main memory 5 or expansion memory (not illustrated) respectively.

Now each composing element in FIG. 1 will be described. The graphics data generation processor 3 plays the role of coprocessor of CPU 1. In other words, this graphics data generation processor 3 performs coordinate transformation and light source calculation, such as fixed point matrix and vector operations, by parallel processing. The major processings of this graphics data generation processor 3 involve processings to determined the address of the processing target image in a predetermined display area based on the coordinate data, the moving amount data and the rotation amount data of each vertex in a 2-D or 3-D space of the image data supplied from CPU 1, and to return this address data to CPU 1, and the processing to calculate the luminance of the image based on the distance from the light source, which is set virtually.

The interface circuit 4 is for interfacing the peripheral devices and a pointing device, such as a mouse and trackball. In ROM 6, the program data required for the operating system of the game system is stored. In terms of a personal computer, ROM 6 corresponds to BIOS (Basic Input Output System).

The decompression circuit 7 performs decompression processing for compressed images which were compressed by intra-encoding conforming to the MPEG (Moving Picture Engineering Group) standard for moving pictures and to the JPEG (Joint Picture Engineering Group) standard for still pictures. Decompression processing includes decoding processing (decoding data encoded by VLC:Variable Length Code), inverse quantization processing, IDCT (Inverse Discrete Cosine Transform) processing, and restoration processing of intra-images.

The drawing processor 10 performs drawing processing for the buffer 21 at each predetermined time T (1 frame, e.g. T=1/60 sec.) based on the drawing instructions issued by CPU 1.

The buffer 21 is comprised of RAM, for example, and consists of a display area (frame buffer) and a non-display area. The display area is a development area for data to be displayed on the display screen of the monitor 22. In this embodiment, the non-display area is a storage area for data to define skeletons, model data to define polygons, animation data to assign motion to models, pattern data to indicate the content of each animation, texture data and color palette data.

Here the texture data is 2-D image data. Color palette data is data for specifying the color of texture data. These data are recorded in the non-display area of the buffer 21 in advance by CPU 1 all at once, or at a plurality of times along with the progress of a game from the recording medium 200.

Drawing instructions are, for example, a drawing instruction for drawing a 3-D image using polygons, and a drawing instruction for drawing an ordinary 2-D image. Here a polygon is a polygonal 2-D virtual graphic, and a triangle is used in this embodiment.

Drawing instructions for drawing a 3-D image using polygons are executed for the polygon vertex address data to indicate the storage position of the polygon vertex coordinate data on the display area of the buffer 21, the texture address data to indicate the storage position of the texture data to be pasted onto polygons in the buffer 21, the color palette address data to indicate the storage position of the color palette data to indicate the colors of the texture data in the buffer 21, and luminance data to indicate the luminance of texture respectively.

Of this data, the polygon vertex address data on the display area is data when the graphics data generation processor 3 executes coordinate transformation on the polygon vertex coordinate data in the 3-D space from CPU 1 based on the moving amount data and the rotation amount data of the screen itself, replacing the polygon vertex coordinate data in the 3-D space with 2-D polygon vertex coordinate data. The luminance data is determined by the graphics data generation processor 3 based on the distance between light sources virtually disposed using the positions shown by the polygon vertex coordinate data from CPU 1 after the above mentioned coordinate transformation.

The above mentioned polygon vertex address data indicates an address on the display area of the buffer 21, and the drawing processor 10 writes texture data corresponding to the range of the display area of the buffer 21 shown by the three polygon vertex address data.

An object, such as a character, in a virtual game space is comprised of a plurality of polygons. CPU 1 associates the coordinate data of each polygon in the 3-D space with the vector data of the corresponding skeleton, and stores this data in the buffer 21. When the movement of a character is expressed, such as moving the character on the display screen of the monitor 22, or when the viewing point position to observe a character is changed, the following processing is executed by the operation of the later mentioned controller 29.

CPU 1 provides the 3-D coordinate data of the vertex of each polygon held in the non-display area of the buffer 21, the moving amount data and the rotation amount data of each polygon determined from data on the coordinates of the skeletons and the rotation amount thereof to the graphics data generation processor 3.

The graphics data generation processor 3 determines the 3-D coordinate data after moving and rotating each polygon sequentially based on the 3-D coordinate data of the vertex of each polygon, and on the moving amount data and the rotation amount data of each polygon.

Of the 3-D coordinate data of each polygon determined in this way, coordinate data in the horizontal and vertical directions is supplied to the drawing processor 10 as address data on the display area of the buffer 21, that is, polygon vertex address data.

The drawing processor 10 writes the texture data indicated by the pre-assigned texture address data to the display area of the triangle of the buffer 21 indicated by the three polygon vertex address data. By this, an object, where texture data is pasted on to many polygons, is displayed on the display screen of the monitor 22.

Drawing instructions for drawing an ordinary 2-D image are executed for vertex address data, texture address data, color palette address data which indicates the storage position of the color palette data to indicate the color of the texture data on the buffer 21, and luminance data which indicates the luminance of the texture respectively. Of this data, vertex address data is coordinate data obtained when the graphics data generation processor 3 executes coordinate transformation on the vertex coordinate data on the 2-D plane from CPU 1 based on the moving amount data and the rotation amount data from CPU 1.

The voice processor 11 writes ADPCM (Adaptive Differential Pulse Code Modulation) data read from the recording medium 200 to the buffer 23, and the ADPCM data stored in this buffer 23 is used as the sound source. The voice processor 11 reads the ADPCM data based on a clock signal with a 44.1 kHz frequency, for example.

The voice processor 11 performs such processing as pitch transformation, adding noise, setting an envelope, setting level, and adding reverb, for the ADPCM data read from the buffer 23.

When the voice data read from the recording medium 200 is PCM data such as CD-DA (Compact Disk Digital Audio), the voice data is converted to ADPCM data by the voice processor 11.

Processing for PCM data by program data is directly executed on the main memory 5. PCM data processed on the main memory 5 is supplied to the voice processor 11, is converted to ADPCM data, then is output from the speaker 25 as voice after the above mentioned various processings are performed.

The recording medium driver 27 is, for example, a CD-ROM drive, hard disk drive, optical disk drive, flexible disk drive, silicon disk drive, or a cassette medium reader.

The recording medium 200 is, for example, a CD-ROM, hard disk, optical disk, flexible disk, or semiconductor memory.

The recording medium driver 27 reads image, voice and program data from the recording medium 200, and supplies the read data to the decoder 12. The decoder 12 executes error correction processing by ECC (Error Correction Code) for playback data from the recording medium driver 27, and supplies the data, for which error correction processing has been executed, to the main memory 5 or to the voice processor 11.

The memory 28 is comprised of, for example, a holder and a card type memory. The cord type memory is for holding various game parameters at interrupt points, such as the holding status at an interrupt point when the game is interrupted during progress.

The controller 29 is a control means which can be controlled from the outside, comprising a first left button 29L1, a second left button 29L2, a first right button 29R1, a second right button 29R2, an up direction key 29U, a down direction key 29D, a left direction key 29L, a right direction key 29R, a start button 29a, a select button 29b, a first button 29c, a second button 29d, a third button 29e, a fourth button 29f, a left stick 29SL, and a right stick 29SR, so as to send control signals according to the operation of a player to CPU 1.

The up direction key 29U, down direction key 29D, left direction key 29L, and right direction key 29R allow the player to send to the CPU 1 commands to move the character or cursor vertically and horizontally on the screen of the monitor 22.

The start button 29a is for the player to instruct the start of the game program data to be loaded from the recording medium 200 to CPU 1. The select button 29b is for the player to instruct various selections on the game program data, which is loaded from the recording medium 200 to the main memory 5, to the CPU 1.

On the controller 29, each button and each key, excluding the left stick 29SL and right stick 29SR, have an ON/OFF switch, which is turned ON by pressing down from the neutral position by an external pressing force, and is turned OFF when the pressing force is cleared and the button or key returns to the neutral position.

The left stick 29SL and right stick 29SR are stick type controllers with configurations almost the same as a joystick. In other words, the left stick or right stick has an upright stick, and can be tilted in a 360° range, including front/back and left/right with a predetermined position of this stick as a fulcrum. And depending on the tilting direction and the tilt angle of this stick, values of the x coordinate in the left/right direction and y coordinate in the front/back direction with the upright position as the origin, are sent to CPU 1 as control signals via the interface circuit 13.

The functions of the first left button 29L1, second left button 29L2, first right button 29R1 and second right button 29R2 differ depending on the game program to be loaded from the recording medium 200.

Now the general operation of the game system will be described. First the power switch (not illustrated) is turned ON, and power is supplied to the game system. If the recording medium 200 is set in the recording medium driver 27 at this time, CPU 1 instructs the recording medium driver 27 to read the program data from the recording medium 200 based on the operating system stored in ROM 6. By this, the recording medium driver 27 reads image, voice and program data from the recording medium 200. The read image, voice and program data is supplied to the decoder 12, where error correction processing is executed.

The image data in the decoder 12, for which error correction processing has been performed, is supplied to the decompression circuit 7 via the bus line 2, and the above mentioned decompression processing is performed, then the image data is supplied to the drawing processor 10, and is written to the non-display area of the buffer 21 by this drawing processor 10.

Also the voice data, for which error correction processing has been performed in the decoder 12, is either written to the main memory 5 or is supplied to the voice processor 11, and is written to the buffer 23.

The program data, for which error correction processing has been performed in the decoder 12, is written to the main memory 5. Hereafter CPU 1 progresses the game based on the game program data stored in the main memory 5 and based on the content of instructions by the player via the controller 29. In other words, CPU 1 performs the control of image processing, control of voice processing, and control of internal processing, based on the content of instructions by the player via the controller 29.

For the control of image processing, calculating the coordinates of each skeleton and calculating the vertex coordinate data of polygons from the pattern data corresponding to the animation to be instructed for characters, supplying the obtained 3-D coordinate data and view point data to the graphics data generation processor 3, and issuing drawing instructions, including address data and luminance data on the display area of the buffer 21 determined by the graphics data generation processor 3, for example, are executed. For the control of voice processing, issuing voice output commands to the voice processor 11 and specifying level and reverb, for example, are executed. For the control of internal processing, operation according to the control of the controller 29, for example, is executed.

The image data, for which error correction processing has been performed in the decoder 12, is supplied to the decompression circuit 7 via the bus line 2, the above mentioned decompression processing is executed here, then the image data is supplied to the drawing processor 10 and is written to the non-display area of the buffer 21 by this drawing processor 10.

The voice data, for which error correction processing has been performed in the decoder 12, is either written to the main memory 5 or is supplied to the voice processor 11, and is written to the buffer 23.

The program data, for which error correction processing has been performed in the decoder 12, is written to the main memory 5. Hereafter CPU 1 progresses the game based on the game program data stored in the main memory 5, and on the content of instructions by the player via the controller 29. In other words, CPU 1 performs control of image processing, control of voice processing, and control of internal processing based on the content of instructions by the player via the controller 29.

In this embodiment, data on a framed model, where a model to which border lines are added and a model for border lines (back model) are overlapped and integrated, is stored in the recording medium 200 in advance, data on the model is read on a predetermined non-display area of the buffer 21 by the drawing instructions of CPU 1, and after the above mentioned image processing is performed on the data, this data is written to the display area, and is then repeatedly read and drawn on the monitor 22, which is the display means.

Figure 2:
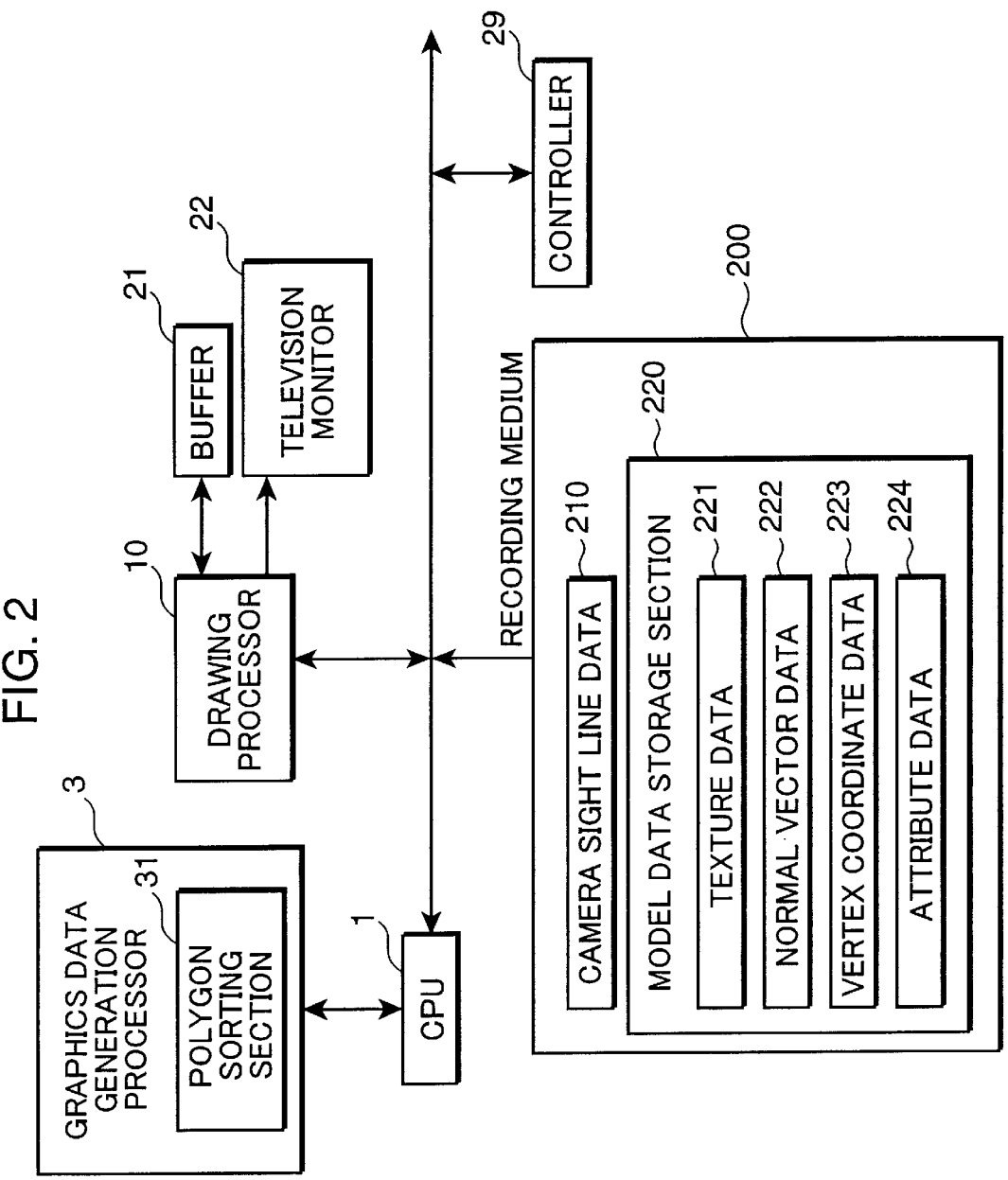
FIG. 2 is a block diagram showing the functional configuration of the major sections, primarily on operation, of the video game system.

FIG. 2 is a block diagram showing the functional configuration of the major section, primarily on operation, of the video game system shown in FIG. 1, and the video game system comprises CPU 1, graphics data generation processor 3, drawing processor 10, recording medium 200, buffer 21, television monitor 22, and controller 29.

The recording medium 200 further comprises a camera sight line data section 210 for storing the view point position and the vector data to indicate the direction of the sight line of the virtual camera, and a model data storage section 220 for storing information on the 3-D model, which is called to the buffer 21 when necessary or all at once according to the development of the game.

The model data storage section 220 has texture data 221 storing the texture data of each polygon constituting a framed model, normal vector data 222 storing the normal vector of each polygon constituting the framed model, vertex coordinate data 223 storing the coordinates of each vertex position of each polygon constituting a framed model, and attribute data 224 storing information on whether each polygon is a polygon for drawing only the front face or a polygon for drawing both faces. (polygon constituting a plane model) in table format, as data corresponding to each polygon for each framed model respectively.

Processing to be executed as a preparation stage of the 3-D game image processing of the present embodiment will now be described. FIG. 3–FIG. 5 are diagrams showing the processing to be executed as a preparation stage of the 3-D game image processing of the present embodiment.

First the original 3-D model (model to which border lines are added) is enlarged. At this time, a coordinate to be the center point of the model to which border lines are added is set, and the model is enlarged in all directions from the center point at a predetermined ratio. In other words, this center point becomes the origin of the local coordinate system, and the vertex coordinates of the enlarged model are each vertex coordinate of the original model multiplied by a predetermined magnification rate. The vertex of each polygon of the enlarged model (model for border lines) is disposed on the normal vector of each vertex of the original 3-D model. By this, an equally enlarged model can be created from the original 3-D model. Then the direction of the normal vector of the enlarged model is inverted inwards. Then the model created as above is corrected, the model to which border lines are added and the model for border lines are integrated into a framed model, and this framed model is stored in a recording medium as a model data. Correction here is to correct problems which are generated when the original 3-D model is enlarged at a predetermined magnification rate, which is performed by setting a new center point and enlarging or reducing the model at a predetermined magnification rate from the center point, and setting new vertex coordinate of the polygon, as described later.

Figure 3A:
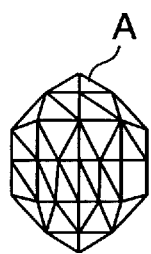
FIGS. 3A to 3C are diagrams showing the processing to be executed as a preparation stage of the 3-D game image processing according to the present invention.
Figure 3B:
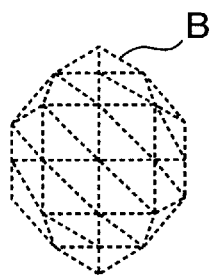
Figure 3C:
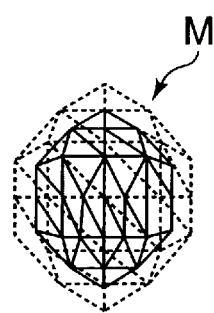
Figure 4:
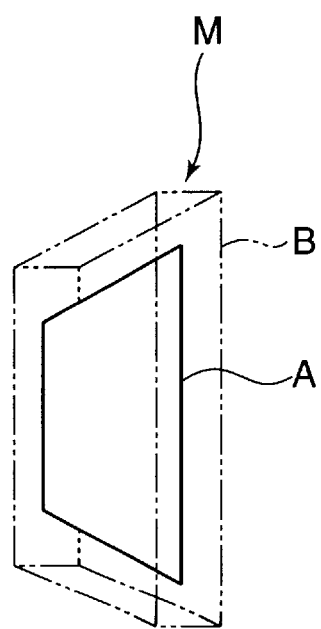
FIG. 4 is a diagram showing the processing to be executed as a preparation stage of the 3-D game image processing according to the present invention.

FIGS. 3A to 3C are diagrams showing an example of a model to which border lines are added, a model for border lines, and a framed model comprised of the model to which border lines are added and the model for border lines. FIG. 3A is model A to which border lines are added, 3B is model B for border lines, and 3C is framed model M where model A and model B are overlapped. Model B is a model when model A is enlarged for the width of the border lines, and model M is stored in a recording medium 200 in advance as a model where model A and model B overlap. In model A, a polygon is divided into small parts to paste texture, so if model B is a model when model A is simply enlarged at a predetermined magnification rate, then the number of polygons to be drawn will be high, and this drawing processing will take time. So for model B, model A is not simply enlarged by a predetermined magnification rate, but the number of polygons can be decreased by omitting the vertex for the texture of model A and the vertex of a polygon which does not influence border lines, so that the time required for drawing processing can be decreased, and high-speed processing becomes possible.

FIG. 4 shows framed model M comprised of plane model A and model B for border lines. Plane model A, which does not have volume, must be seen from both the front and back, so both faces are always drawn regardless the front/back of the polygon. Not only when an entire model is a plane, but also when part of a model is a plane as well, the plane part is always drawn regardless the front/back. Such a plane model A is enclosed with rectangular parallelepiped shaped model B for border lines, and is stored in the recording medium in advance as framed model M, so as to draw border lines from any angle.

Figure 5A:
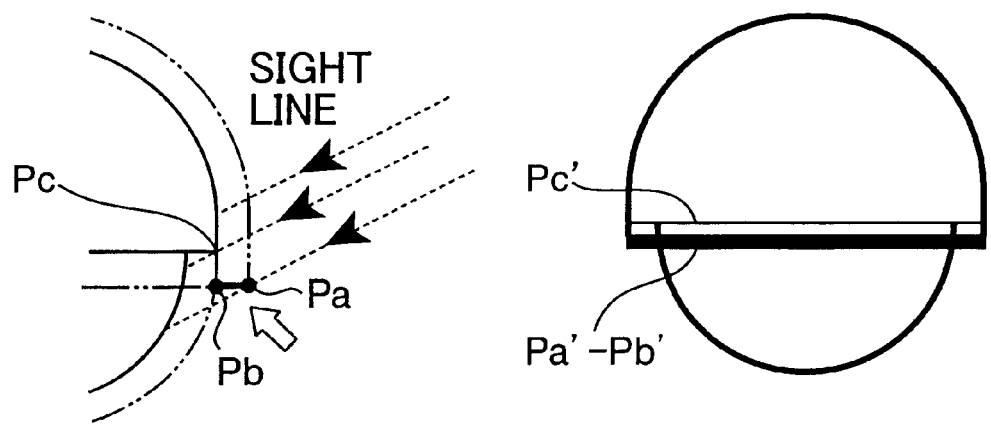
FIGS. 5A and 5B are diagrams showing the processing to be executed as a preparation stage of the 3-D game image processing according to the present invention.
Figure 5B:
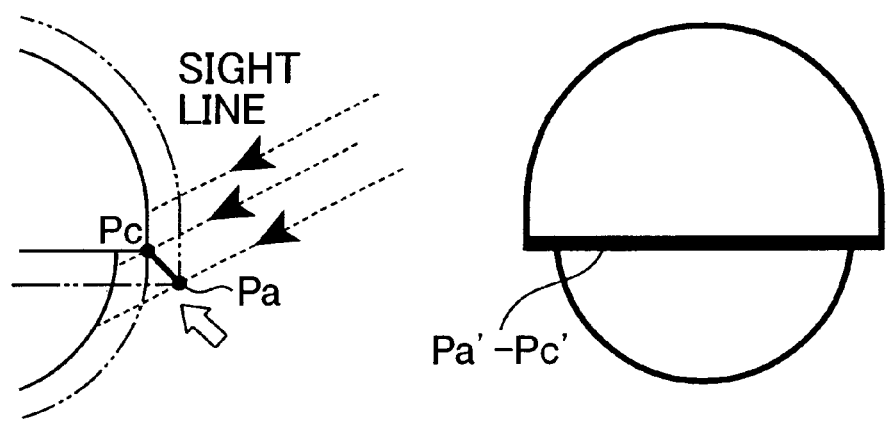

Diagrams to the left of FIGS. 5A and 5B are side view when the drawn polygon model is viewed from the side face with respect to the sight line direction respectively, and diagrams at the right are front views when the drawn polygon model is viewed from the sight line direction. If a model has a section where two or more polygon models overlap, or which have bumps, such as small steps, then merely enlarging the original model creates a gap between the edge of the original model and the polygon of the model for border lines when viewed from a specific view point, where border lines look as if floating, or which exhibit flickers. For example, in FIG. 5A, the polygon comprised of the vertex Pa and the vertex Pb, which are connected, is drawn as border lines, indicated with a thick line Pa'-Pb' shown in the right side of FIG. 5A, so a gap is created between the border lines Pa'-Pb' and the original 3-D model when viewed from the sight line direction shown in FIG. 5A. To prevent such a phenomenon, correction is performed so that such sections where gaps are created are closed when viewed from various view points. In other words, as FIG. 5B shows, vertex Pb is moved to vertex Pc, and vertex Pa and vertex Pc are connected, then the section between the original 3-D model and the model for framing is closed by a polygon, and is drawn as a border line, indicated with a thick line Pa'-Pc' in the right hand side diagram.

Figure 6:
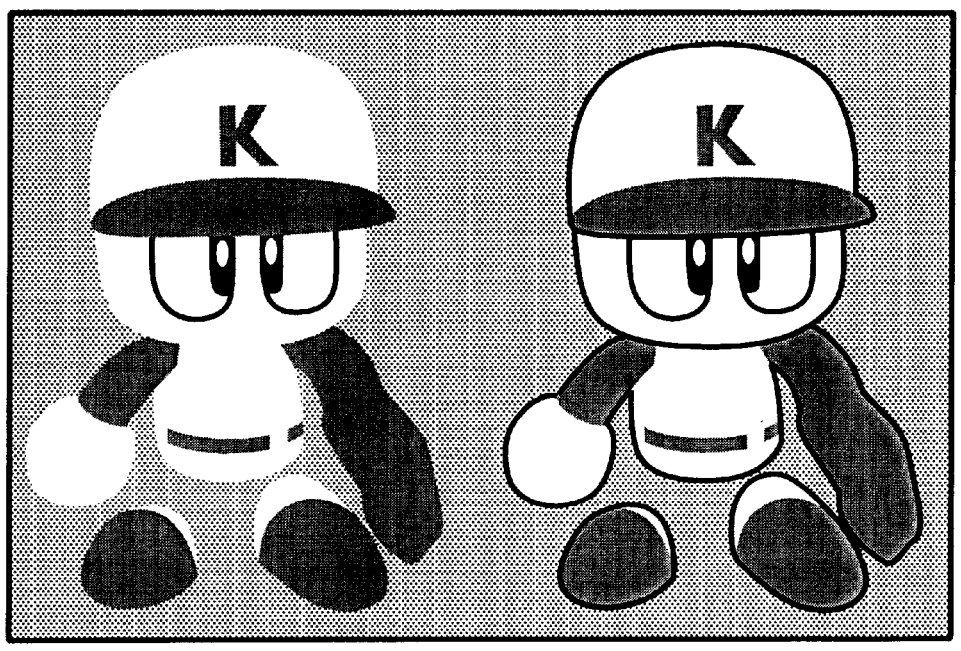
FIG. 6(1) and FIG. 6(2) are diagrams showing a concrete example of a framed model which was drawn.

FIG. 6 is a diagram showing a concrete example of a framed model which was drawn. FIG. 6(1) is an example when a 3-D model is drawn before adding border lines, and 6B is an example when a framed model where 3-D model (1) and a model for border lines are overlapped, which is an example of a polygon model (character) to be actually displayed on the monitor 22. As FIG. 6 shows, by adding border lines to the character of a polygon model, the model is expressed as animation, and the model stands out from the background images.

The graphics data generation processor 3 is comprised of a polygon sorting section 31, which sorts the polygon constituting the 3-D model into a front face polygon which faces the direction of the view point position of the virtual camera and a back face polygon which faces the opposite direction of the view point position of the virtual camera.

The polygon sorting section 31 calculates the inner product of the plane normal vector of each polygon constituting the 3-D model and the camera sight line vector, so as to sort each polygon constituting the 3-D model into a back face polygon which is a polygon where the inner product is positive, and a front face polygon which is a polygon where the inner product is not positive.

Figure 8A:
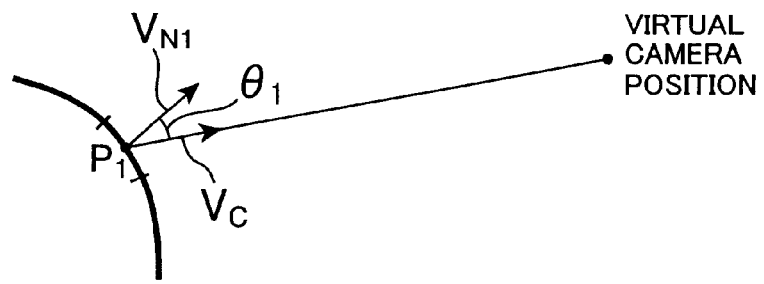
FIGS. 8A and 8B are explanatory diagrams showing how the inner product is calculated such that a front face polygon and a back face polygon is determined.
Figure 8B:
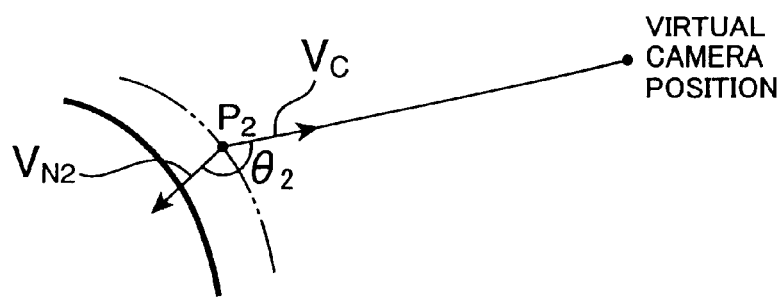

FIGS. 8A and 8B show how the inner product of two vectors is calculated for clarification of the present invention. As can be seen from FIG. 8A, a vector $V_{n1}$ represents a normal vector for a polygon P1, shown to be in 2D for explanation purpose, and a vector $V_c$ represents a unit vector directing a position of a virtual camera from the origin of the vector $V_{n1}$. Then the inner product of these vectors can be calculated as:

$$V_{n1} \cdot Vc = |Vn_1||V_c|\cos \theta_1$$

where "| |" indicates an absolute value
In the case shown in FIG. 8A, the inner product becomes a positive value, then the polygon P1 is considered to be a front face polygon which is to be drawn.

Similarly, a vector $Vn_2$ represents a normal vector of a polygon P2, shown to be in 2D, and a vector $V_c$ represents a unit vector directing a position of a virtual camera from the origin of the vector $Vn_2$. Then the inner product of these vectors can be calculated as:

$$Vn_2 \cdot Vc = |Vn_2||V_c|\cos \theta_2$$

In the case shown in FIG. 8B, the inner product becomes a negative value, then the polygon P2 is considered to be a back face polygon which is not to be drawn.

The drawing processor 10 performs texture mapping and rendering processing on each model arranged in the 3-D space, so as to create an image of the entire model. Here only the front face polygons sorted by the polygon sorting section 31 are drawn, so a polygon outside, the view point side is drawn for the model to which border lines are added, and for models for border lines, a polygon outside, the view point side is not drawn, but a polygon inside is drawn, so that a framed model with border lines is drawn.

Figure 7:
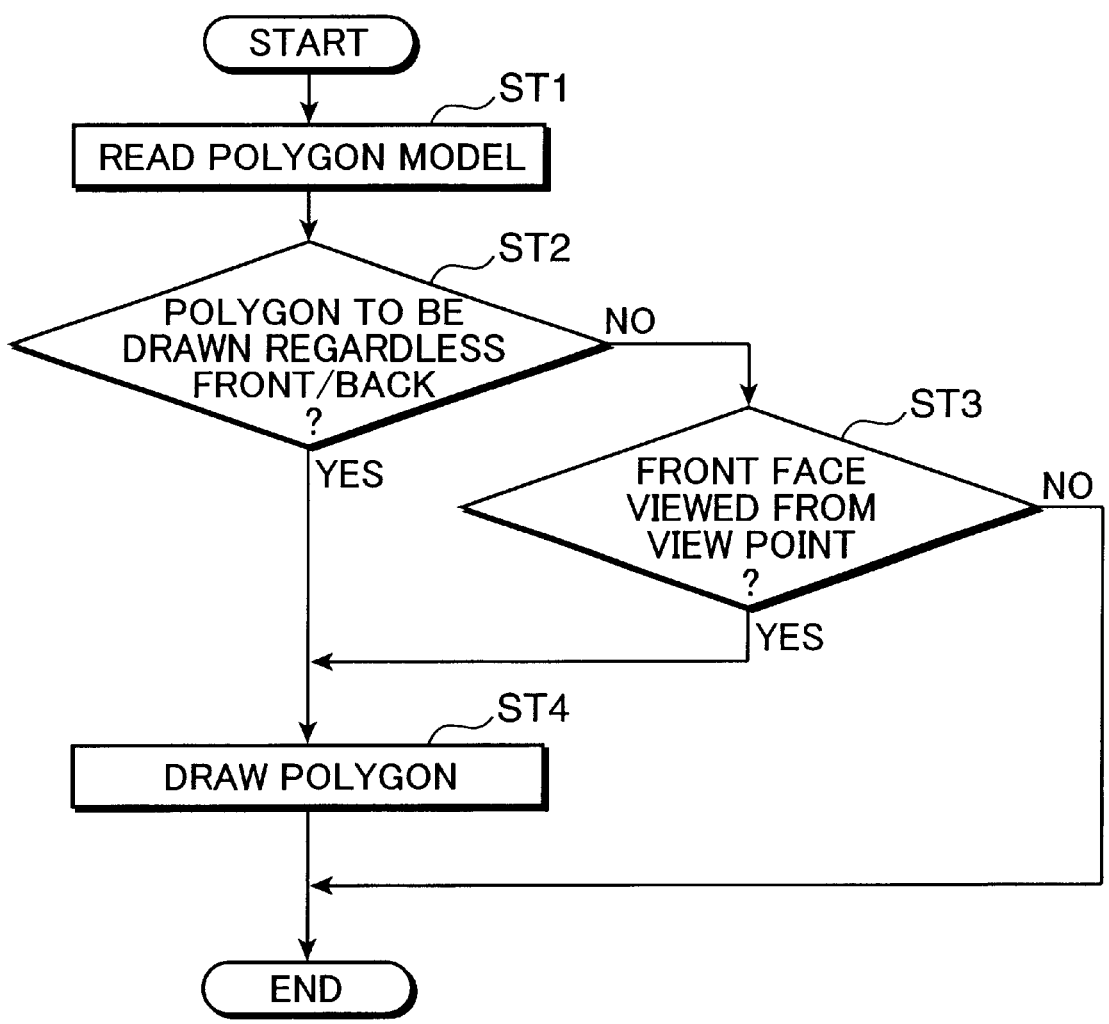
FIG. 7 is a flow chart showing the procedure of the 3-D game image processing method according to the present invention.

FIG. 7 is a flow chart showing the procedure of the 3-D game image processing method according to the present invention. First the graphics data generation processor 3 reads the polygon model from the model data storage section 52 based on the drawing instructions from CPU 1 (ST1). Then the polygon model which was read is judged whether the polygon is to be drawn, regardless the front or back, based on the attribute data (ST2). And if the polygon is to be drawn, regardless the front or back (plane model) (YES in ST2), the polygon is drawn as is, and if the polygon is a model with volume (NO in ST2), the procedure advances to Step ST3. The polygon sorting section 31 sorts the front and back of each polygon of a model with volume (ST3), and if it is a front face polygon (YES in ST3), the polygon is drawn by the drawing processor 10 (ST4), and if it is a back face polygon (NO in ST3), the procedure ends here without drawing the polygon.

In the present embodiment, the color of a border line can be changed depending on the location. In other words, this can be implemented by setting the texture data of each polygon of the model for border lines to various colors and materials. For example, by adding gradation to the polygons of a model for border lines used for a character to appear in the game, an emission of aura can be expressed.

Summing up the present invention, the present invention relates to a computer readable recording medium which stores a 3-D game image processing program for drawing a model comprised of a plurality of polygons in a virtual game space. The 3-D game image processing program comprises the steps of: (a) storing a framed model; said frame model is made by: enlarging a 3-D model formed with a plurality of polygons; inverting a direction of a normal vector of each polygon constituting said enlarged model opposite to a direction of a normal vector of each polygon constituting said 3-D model to form a back model; and overlaying said back model on said 3-D model to form said framed model; and (b) drawing only polygons facing the direction of the viewpoint position of said virtual camera according to a drawing instruction of said framed model.

According to the aforementioned configuration, a back model, where a direction of a normal vector of each polygon constituting an enlarged model which is acquired by enlarging a 3-D model is a direction opposite the direction of a normal vector of each polygon constituting the 3-D model, is overlaid onto the model and is stored in advance as a framed model. According to the drawing instructions of the framed model, the framed model is read from a recording medium, and based on the view point position of a virtual camera in the virtual game space and the direction of the normal vector of each polygon constituting the framed model, it is judged whether the polygon has a normal vector facing the direction of the view point position of the virtual camera. And only polygons which were judged as having a normal vector facing the direction of the view point position of the virtual camera are drawn. Accordingly, a model where border lines are added and a model for border lines are integrated, and are stored as a framed model in advance, so drawing processing becomes easier and the time required for processing is decreased, which is suitable for application to games.

It is preferable that the polygon with the normal vector having a positive component along the direction towards the viewpoint of said virtual camera in the virtual game space is to be sorted out and is drawn according to the said drawing instruction of the framed model.

Furthermore, it is preferable that the back model has less number of polygons than the original 3-D model.

According to this configuration, for the back model, the time required for drawing processing can be decreased by decreasing the number of polygons which do not influence the border lines. In other words, the original 3-D model is divided into many pieces since polygons to paste many textures are required, therefore the number of polygons is high, so by eliminating the vertexes of polygons which are not related to border lines when the back model is created, the model is simplified and the drawing speed increases. Accordingly, vertexes of a polygon, which is not related to border lines, are eliminated when a back model is created, so the model is simplified and the drawing speed is increased.

In addition, it can be set that mapping of a plurality of types of textures is enabled for polygons constituting the back model.

According to this configuration, mapping of a plurality of types of texture is enabled for polygons constituting the back model, so the polygons in the back model can have not only border lines but also various color texture mappings, and can be used for other expression methods. An example of another expression method is to express emitting aura by executing gradation on the border lines to be added to the characters which appear in a game. Accordingly, not only border lines but various colors of texture mapping is performed on a polygon of a back model, so this invention can be applied to other expression methods, and is suitable for application to games.

Moreover it can be constructed that when the 3-D model has a shape having step sections, a polygon, the vertexes of which are vertexes of the polygon constituting the part protruding outside the step sections of the 3-D model and the vertexes of the polygon constituting the part protruding outside the step sections of the back model corresponding to the 3-D model, is included in the framed model.

According to this configuration, when the 3-D model has a shape having step sections, a polygon, the vertexes of which are vertexes of the polygon constituting the part protruding outside the step sections of the 3-D model and vertexes of the polygon constituting the part protruding outside the step sections of the reversed model corresponding to the 3-D model, is included in the framed model, so that when the framed model is displayed, a clear framed model, free from the edges added distant from the 3-D model and the occurrence of flicker, can be provided. Accordingly, problems due to drawing processing are solved, so a clear framed model can be provided.

Yet moreover, the back model can be created such that the direction of the normal vector of a polygon along the thickness direction of the enlarged model, which is acquired by enlarging and adding thickness to the plane model, is the inward direction of the enlarged model.

According to this configuration, the back model is created such that the direction of the normal vector of a polygon along the thickness direction of the enlarged model, which is obtained by enlarging and adding thickness to the plane model, is the inward direction of the enlarged model, so the framed model of the plane model can be drawn without being influenced by the change of the view point position. Accordingly, a framed model of a plane model can be drawn without the influence of changes of the view point position.

Furthermore, drawing processing is possible for both sides of a polygon constituting the plane model.

According to this configuration, the polygon constituting the plane model has attribute information to enable drawing processing on both sides, so the plane model can be drawn without being influenced by the change of the view point position. Accordingly, a plane model can be drawn without the influence of the changes of the view point position.

The present invention takes a form of 3-D game image processing method for drawing a model comprised of a plurality of polygons in a virtual game space in which said 3-D game image processing method comprising the steps of: (a) storing a framed model; said frame model is made by: enlarging a 3-D model formed with a plurality of polygons; inverting a direction of a normal vector of each polygon constituting said enlarged model opposite to a direction of a normal vector of each polygon constituting said 3-D model to form a back model; and overlaying said back model on said 3-D model to form said framed model; and (b) drawing only polygons facing the direction of the viewpoint position of said virtual camera according to a drawing instruction of said framed model.

According to the aforementioned configuration, a back model, where a direction of a normal vector of each polygon constituting an enlarged model which is acquired by enlarging a 3-D model is a direction opposite the direction of a normal vector of each polygon constituting the 3-D model, is overlaid onto the model and is stored in advance as a framed model. According to the drawing instructions of the framed model, the framed model is read from a recording medium, and based on the view point position of a virtual camera in the virtual game space and the direction of the normal vector of each polygon constituting the framed model, it is judged whether the polygon has a normal vector facing the direction of the view point position of the virtual camera. And only polygons which were judged as having a normal vector facing the direction of the view point position of the virtual camera are drawn. Accordingly, a model to which border lines are added and a model for border lines are integrated and stored as a framed model in advance, so drawing processing becomes easier and the time required for processing is decreased, which is suitable for application to games.

The present invention also takes a form of a video game machine for drawing a model comprised of a plurality of polygons in a virtual game space displayed by displaying means, comprising: storage means for storing a back model, where a direction of a normal vector of each polygon constituting an enlarged model which is acquired by enlarging a 3-D model is a direction opposite the direction of a normal vector of each polygon constituting the 3-D model, is overlaid onto the 3-D model in advance as a framed model; reading means for reading the framed model based on the drawing instructions of the framed model; judgment means for judging whether the polygon has a normal vector facing the direction of the view point position of the virtual camera, based on the view point position of the virtual camera and the direction of the normal vector of each polygon constituting the read framed model in the virtual game space; and drawing means for performing texture mapping on the polygon judged as having a normal vector facing the direction of the view point position of the virtual camera, loading the polygon into a display memory, and reading the content of the display memory into the display means at a predetermined cycle.

According to this configuration, a back model, where a direction of a normal vector of each polygon constituting an enlarged model which is acquired by enlarging a 3-D model is a direction opposite the direction of a normal vector of each polygon constituting the 3-D model, is overlaid onto the 3-D model and is stored in advance in the storage means as a framed model. According to the drawing instructions of the framed model, the framed model is read from the storage means by the reading means, and according to the view point of the virtual camera, the direction of the normal vector of each polygon constituting the framed model in the virtual game space, the judgment means judges whether the polygon has a normal vector facing a direction of the view point position of the virtual camera. And drawing means performs texture mapping on a polygon which was judged as having a normal vector facing the direction of the view point position of the virtual camera, loads the polygon into the display memory, and reads the content of the display memory to the display means at a predetermined cycle to draw the framed model. Accordingly, a model to which border lines are added and a model for border lines are integrated and stored as a framed model in advance, so drawing processing becomes easier and the time required for processing is decreased, which is suitable for application to games.

This application is based on Japanese patent application serial no. 2001-097626, filed in Japan Patent Office on Mar. 29, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A computer readable recording medium storing a 3-D game image processing program for drawing a model comprised of a plurality of polygons in a virtual game space, said 3-D game image processing program comprising the steps of:
   (a) storing a framed model, said framed model being made by:
      enlarging a 3-D model formed with a plurality of polygons;
      inverting a direction of a normal vector of each polygon constituting said enlarged model with respect to a direction of a normal vector of each polygon constituting said 3-D model to form a back model; and
      overlaying said back model on said 3-D model to form said framed model; and
   (b) drawing only polygons facing a direction of a viewpoint position of a virtual camera according to a drawing instruction of said framed model such that a clearance is formed between said enlarged model and said 3-D model defining a border line of said 3-D model.

2. The computer readable recording medium according to claim 1, wherein the polygon with the normal vector thereof having a positive component along the direction towards the viewpoint of said virtual camera in the virtual game space is to be sorted out and is drawn according to the said drawing instruction of the framed model.

3. The computer readable recording medium according to claim 1, wherein the back model has less number of polygons than the original 3-D model.

4. The computer readable recording medium according to claim 1, wherein mapping of a plurality of types of textures is enabled for polygons constituting the back model.

5. The computer readable recording medium according to claim 1, wherein when the 3-D model has a shape having step sections, a polygon the vertexes of which are the vertexes of the polygon constituting the part protruding outside the step sections of the 3-D model and the vertexes of the polygon constituting the part protruding outside the step sections of the back model corresponding to said 3-D model, is included in the framed model.

6. A computer readable recording medium storing a 3-D game image processing program for drawing a model comprised of a plurality of polygons in a virtual game space, said 3-D game image processing program comprising the steps of:
   (a) storing a framed model, said framed model being made by:
      enlarging a 3-D model formed with a plurality of polygons to form an enlarged model;
      inverting a direction of a normal vector of each polygon constituting said enlarged model with respect to a direction of a normal vector of each polygon constituting said 3-D model to form a back model; and
      overlaying said back model on said 3-D model to form said framed model, the back model being created such that the direction of the normal vector of a polygon along the thickness direction of the enlarged model, which is acquired by enlarging and adding thickness to a plane model, is an inward direction of the enlarged mode; and
   (b) drawing only polygons facing a direction of a viewpoint position of a virtual camera according to a drawing instruction of said framed model.

7. The computer readable recording medium according to claim 1, wherein drawing processing is possible for both faces of a polygon constituting the plane model.

8. A 3-D game image processing method for drawing a model comprised of a plurality of polygons in a virtual game space, said 3-D game image processing method comprising the steps of:
   (a) storing a framed model, said framed model being made by:
      enlarging a 3-D model formed with a plurality of polygons;
      inverting a direction of a normal vector of each polygon constituting said enlarged model with respect to a direction of a normal vector of each polygon constituting said 3-D model to form a back model; and overlaying said back model on said 3-D model to form said framed model; and (b) drawing only polygons facing the direction of a viewpoint position of a virtual camera according to a drawing instruction of said framed model such that a clearance is formed between said enlarged model and said 3-D model defining a border line of said 3-D model.

9. A video game machine for drawing a model comprised of a plurality of polygons in a virtual game space displayed by display means, comprising:

storage means for storing a framed model in advance, said framed model being made by overlaying a back model onto a 3-D model, the back model being formed by enlarging the 3-D model to acquire an enlarged model and inverting a direction of a normal vector of each polygon constituting the enlarged model with respect to a direction of a normal vector of each polygon constituting said 3-D model;

reading means for reading said framed model based on the drawing instructions of said framed model;

judgment means for judging whether the polygon has a normal vector facing the direction of a viewpoint position of a virtual camera in the virtual game space based on the viewpoint position of said virtual camera, and the direction of the normal vector of each polygon constituting the read framed model; and drawing means for performing texture mapping on the polygon judged as having a normal vector facing the direction of the viewpoint position of said virtual camera, loading the polygon into a display memory, and reading the content of said display memory to the display means at a predetermined cycle.

10. A 3-D game image processing program for drawing a model comprised of a plurality of polygons in a virtual game space, said 3-D game image processing program comprising the steps of:

(a) storing a framed model, said framed model being made by: enlarging a 3-D model formed with a plurality of polygons;

inverting a direction of a normal vector of each polygon constituting said enlarged model with respect to a direction of a normal vector of each polygon constituting said 3-D model to form a back model; and overlaying said back model on said 3-D model to form said framed model; and (b) drawing only polygons facing the direction of a viewpoint position of a virtual camera according to a drawing instruction of said framed model such that a clearance is formed between said enlarged model and said 3-D model defining a border line of said 3-D model.

11. A computer readable recording medium storing a 3-D game image processing program for drawing a model comprised of a plurality of polygons in a virtual game space, said 3-D game image processing program comprising the steps of:

(a) storing a framed model, said framed model being made by:

enlarging a 3-D model formed with a plurality of polygons;

inverting a direction of a normal vector of each polygon constituting said enlarged model with respect to a direction of a normal vector of each polygon constituting said 3-D model to form a back model; and overlaying said back model on said 3-D model to form said framed model;

(b) drawing only polygons facing a direction of a viewpoint position of a virtual camera according to a drawing instruction of said framed model such that a clearance between said enlarged model and said 3-D model defines a border line of said 3-D model; and (c) making a correction when the 3-D model has a shape including a step section by including a correction polygon in the framed model, vertexes of the correction polygon including:

first vertexes of a first polygon constituting a first part protruding outside of the step section of the 3-D model; and second vertexes of a second polygon constituting a second part protruding outside the step section of the back model corresponding to 3-D model.

12. A 3-D game image processing method for drawing a model comprised of a plurality of polygons in a virtual game space, said 3-D game image processing method comprising the steps of:

enlarging a 3-D model comprised of polygons to form an enlarged model comprised of enlarged polygons, a normal vector of each of the enlarged polygons having a particular direction matching a direction of the normal vector of each of the polygons of the 3-D model;

inverting the particular direction of each said normal vector of each of the enlarged polygons comprising said enlarged model such that a back model is acquired in which an inverted normal vector of each of said enlarged polygons is opposed to the direction of the normal vector of each of the polygons constituting said 3-D model;

overlaying said back model on said 3-D model to form a framed model, said back model being positioned relative to the 3-D model so as to form a framed border thereabout defined by a clearance between respective outer boundaries of the back model and the 3-D model;

storing the framed model; and drawing only particular ones of the enlarged polygons having a component of the inverted normal vector thereof facing a direction of a viewpoint position of a virtual camera according to a drawing instruction of said framed model.

* * * * *